US010804822B2

(12) United States Patent
Alcorn et al.

(10) Patent No.: US 10,804,822 B2
(45) Date of Patent: Oct. 13, 2020

(54) ELECTRONIC CIRCUIT FOR REDUCING ROTATION SPEED OF AN UNPOWERED ELECTRIC MOTOR

(71) Applicant: Allegro MicroSystems, LLC, Manchester, NH (US)

(72) Inventors: William Boyd Alcorn, Boylston, MA (US); Robert Stoddard, Lincoln, MA (US); Timothy Reynolds, Westborough, MA (US)

(73) Assignee: Allegro MicroSystems, LLC, Manchester, NH (US)

( * ) Notice: Subject to any disclaimer, the term of this patent is extended or adjusted under 35 U.S.C. 154(b) by 0 days.

(21) Appl. No.: 16/504,520

(22) Filed: Jul. 8, 2019

(65) Prior Publication Data

US 2020/0028452 A1    Jan. 23, 2020

Related U.S. Application Data

(60) Provisional application No. 62/701,027, filed on Jul. 20, 2018.

(51) Int. Cl.
*H02P 3/24*    (2006.01)

(52) U.S. Cl.
CPC ............ *H02P 3/24* (2013.01); *H02P 2201/09* (2013.01)

(58) Field of Classification Search
CPC .............................. H02P 3/24; H02P 2201/09
See application file for complete search history.

(56) References Cited

U.S. PATENT DOCUMENTS 5,434,738 A    7/1995  Kurszewski et al.
6,005,359 A *  12/1999  Brambilla ............. G11B 19/22
                                                       318/368

(Continued)

OTHER PUBLICATIONS

Office Action and Search Report with English translation dated Feb. 11, 2020 for Taiwan Application No. 108125091; 9 pages.

(Continued)

*Primary Examiner* — Cortez M Cook
(74) *Attorney, Agent, or Firm* — Daly, Crowley, Mofford & Durkee, LLP (57) ABSTRACT

A motor drive circuit for driving an electric motor includes a plurality of driver circuits, each one of the plurality of driver circuit comprising a high side transistor coupled to a low side transistor in a half bridge arrangement, wherein each one of the high side transistors and each one of the low side transistors has a respective control node and respective first and second current passing nodes, wherein the second current passing node of each of the high side transistors is coupled to the first current passing node of a respective one of the low side transistors at a respective junction node, wherein each one of the plurality of driver circuits is operable to drive a respective current out of a respective junction node into a respective winding of the electric motor. The motor drive circuit further includes a capacitor coupled to the first current passing node of each one of the high side transistors, the capacitor operable to hold a capacitor voltage. The motor drive circuit further includes a power loss brake control circuit coupled to receive the capacitor voltage from the capacitor and operable to sense when a power supply voltage to the motor drive circuit is below a threshold voltage and, in a braking mode of operation, the high side transistors are off, and also in the braking mode of operation, when the power supply voltage is below the threshold voltage, the power loss brake control circuit is operable to generate at least one pulse signal having at least two state transitions and operable to communicate the at least one pulse signal to a respective at least one of the control nodes of a respective at least one of the low side transistors, resulting in on and off conditions of the at least one of the low side transistors, wherein the on condition of the at least one of the low side transistors results in the braking mode of operation during the on condition, and wherein the at least two state transitions results in a voltage boosting operation such that the capacitor voltage is a boosted voltage, the (Continued)

boosted voltage higher than a voltage that would be achieved without the at least two state transitions.

21 Claims, 7 Drawing Sheets

(56) References Cited

U.S. PATENT DOCUMENTS

| | | |
|---|---|---|
| 7,590,334 B2 | 9/2009 | Yabusaki et al. |
| 7,615,953 B2 | 11/2009 | Doglioni Majer |
| 7,747,146 B2 | 6/2010 | Milano et al. |
| 7,839,113 B2 | 11/2010 | Maeda et al. |
| 8,093,844 B2 | 1/2012 | Milesi et al. |
| 8,729,841 B2 | 5/2014 | Reynolds et al. |
| 8,742,713 B2 | 6/2014 | Ng |
| 2017/0194890 A1* | 7/2017 | Yoneshima ............. H02P 23/04 |
| 2020/0021212 A1 | 1/2020 | Yamada et al. |
| 2020/0028456 A1 | 1/2020 | Morioka et al. |

OTHER PUBLICATIONS

Response to Office Action with English translation dated May 11, 2020 for Taiwan Application No. 108125091; 37 pages.

* cited by examiner

ELECTRONIC CIRCUIT FOR REDUCING ROTATION SPEED OF AN UNPOWERED ELECTRIC MOTOR

CROSS REFERENCE TO RELATED APPLICATIONS

This application claims the benefit under 35 U.S.C. § 119(e) of U.S. Provisional Application No. 62/701,027 filed Jul. 20, 2018, which application is incorporated herein by reference in its entirety.

STATEMENT REGARDING FEDERALLY SPONSORED RESEARCH

Not Applicable.

FIELD OF THE INVENTION

This invention relates generally to motor drive circuits for driving an electric motor, more particularly, to an motor drive circuit to reduce a rotation speed of an electric motor, for example, when the electric motor is disconnected from a power supply.

BACKGROUND

In some applications of fans run by electric motors, when a motor drive circuit is used to turn a fan with a motor is not powered on, or is otherwise malfunctioning, it is desirable to minimize the fan (i.e., motor) rotation, for example, when other fans are blowing within the same enclosure. If the unpowered or malfunctioning fan is allowed to spin freely, it may be a safety hazard. Also, the unpowered or malfunctioning fan, if allowed to spin freely, may negatively impact an environment, e.g., a thermal environment, in which the fan would otherwise function. Essentially, airflow generated by other fans in the same enclosure could more easily enter or exit in the wrong direction past the unpowered fan that is allowed to spin freely.

It would be desirable to provide a motor drive circuit that can retard the rotation of an electric motor, for example, an electric motor coupled to a fan, when the electric motor and drive circuits that cause the electric motor to turn in normal operation are powered off or otherwise malfunction.

SUMMARY

The present invention provides a motor drive circuit that can retard the rotation of an electric motor, for example, an electric motor coupled to a fan, when the electric motor and motor drive circuit that cause the electric motor to turn in normal operation are powered off or otherwise malfunction.

In accordance with an example useful for understanding an aspect of the present invention, a motor drive circuit for driving an electric motor includes a plurality of driver circuits, each one of the plurality of driver circuit comprising a high side transistor coupled to a low side transistor in a half bridge arrangement, wherein each one of the high side transistors and each one of the low side transistors has a respective control node and respective first and second current passing nodes, wherein the second current passing node of each of the high side transistors is coupled to the first current passing node of a respective one of the low side transistors at a respective junction node, wherein each one of the plurality of driver circuits is operable to drive a respective current out of a respective junction node into a respective winding of the electric motor. The motor drive circuit further includes a capacitor coupled to the first current passing node of each one of the high side transistors, the capacitor operable to hold a capacitor voltage. The motor drive circuit further includes a power loss brake control circuit coupled to receive the capacitor voltage from the capacitor and operable to sense when a power supply voltage to the motor drive circuit is below a threshold voltage and, in a braking mode of operation, the high side transistors are off, and also in the braking mode of operation, when the power supply voltage is below the threshold voltage, the power loss brake control circuit is operable to generate at least one pulse signal having at least two state transitions and operable to communicate the at least one pulse signal to a respective at least one of the control nodes of a respective at least one of the low side transistors, resulting in on and off conditions of the at least one of the low side transistors, wherein the on condition of the at least one of the low side transistors results in the braking mode of operation during the on condition, and wherein the at least two state transitions results in a voltage boosting operation such that the capacitor voltage is a boosted voltage, the boosted voltage higher than a voltage that would be achieved without the at least two state transitions.

In accordance with an example useful for understanding another aspect of the present invention, a method of driving an electric motor with a motor drive circuit includes providing a plurality of driver circuits, each one of the plurality of driver circuit comprising a high side transistor coupled to a low side transistor in a half bridge arrangement, wherein each one of the high side transistors and each one of the low side transistors has a respective control node and respective first and second current passing nodes, wherein the second current passing node of each of the high side transistors is coupled to the first current passing node of a respective one of the low side transistors at a respective junction node, wherein each one of the plurality of driver circuits is operable to drive a respective current out of a respective junction node into a respective winding of the electric motor. The method further includes providing a capacitor coupled to the first current passing node of each one of the high side transistors. The method further includes holding a capacitor voltage on the capacitor. The method further includes sensing when a power supply voltage to the motor drive circuit is below a threshold voltage to identify a braking mode of operation, and when in the braking mode of operation, the method further includes turning the high side transistors off; generating at least one pulse signal having at least two state transitions; and communicating the at least one pulse signal to a respective at least one of the control nodes of a respective at least one of the low side transistors, resulting in on and off conditions of the at least one of the low side transistors, wherein the on condition of the at least one of the low side transistors results in the braking mode of operation during the on condition, and wherein the at least two state transitions results in a voltage boosting operation such that the capacitor voltage is a boosted voltage, the boosted voltage higher than a voltage that would be achieved without the at least two state transitions.

In accordance with an example useful for understanding another aspect of the present invention, a motor drive circuit for driving an electric motor includes a plurality of driver circuits, each one of the plurality of driver circuit comprising a high side transistor coupled to a low side transistor in a half bridge arrangement, wherein each one of the high side transistors and each one of the low side transistors has a respective control node and respective first and second current passing nodes, wherein the second current passing node of each of the high side transistors is coupled to the first current passing node of a respective one of the low side transistors at a respective junction node, wherein each one of the plurality of driver circuits is operable to drive a respective current out of a respective junction node into a respective winding of the electric motor. The motor drive circuit further includes capacitor coupled to the first current passing node of each one of the high side transistors, the capacitor operable to hold a capacitor voltage. The motor drive circuit further includes means for sensing when a power supply voltage to the motor drive circuit is below a threshold voltage to identify a braking mode of operation, and when in the braking mode of operation, the motor drive circuit further includes means for turning the high side transistors off; means for generating at least one pulse signal having at least two state transitions; and means for communicating the at least one pulse signal to a respective at least one of the control nodes of a respective at least one of the low side transistors, resulting in on and off conditions of the at least one of the low side transistors, wherein the on condition of the at least one of the low side transistors results in the braking mode of operation during the on condition, and wherein the at least two state transitions results in a voltage boosting operation such that the capacitor voltage is a boosted voltage, the boosted voltage higher than a voltage that would be achieved without the at least two state transitions.

BRIEF DESCRIPTION OF THE DRAWINGS

The foregoing features of the invention, as well as the invention itself may be more fully understood from the following detailed description of the drawings, in which.

DETAILED DESCRIPTION

Before describing the present invention, some introductory concepts and terminology are explained.

As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals.

In some embodiments, the "processor" can be embodied in an application specific integrated circuit (ASIC), which can be an analog ASIC or a digital ASIC. In some embodiments, the "processor" can be embodied in a microprocessor with associated program memory. In some embodiments, the "processor" can be embodied in a discrete electronic circuit, which can be analog or digital.

As used herein, the term "module" is used to describe a "processor."

A processor can contain internal processors or internal modules that perform portions of the function, operation, or sequence of operations of the processor. Similarly, a module can contain internal processors or internal modules that perform portions of the function, operation, or sequence of operations of the module.

While electronic circuits shown in figures herein may be shown in the form of analog blocks or digital blocks, it will be understood that the analog blocks can be replaced by digital blocks that perform the same or similar functions and the digital blocks can be replaced by analog blocks that perform the same or similar functions. Analog-to-digital or digital-to-analog conversions may not be explicitly shown in the figures but should be understood.

As used herein, the term "predetermined," when referring to a value or signal, is used to refer to a value or signal that is set, or fixed, in the factory at the time of manufacture, or by external means, e.g., programming, thereafter. As used herein, the term "determined," when referring to a value or signal, is used to refer to a value or signal that is identified by a circuit during operation, after manufacture.

As used herein, the term "active electronic component" is used to describe an electronic component that has at least one p-n junction. A transistor, a diode, and a logic gate are examples of active electronic components. In contrast, as used herein, the term "passive electronic component" as used to describe an electronic component that does not have at least one p-n junction. A capacitor and a resistor are examples of passive electronic components.

As used herein, the terms "line" and "linear" are used to describe either a straight line or a curved line. The line can be described by a function having any order less than infinite.

Figure 1:
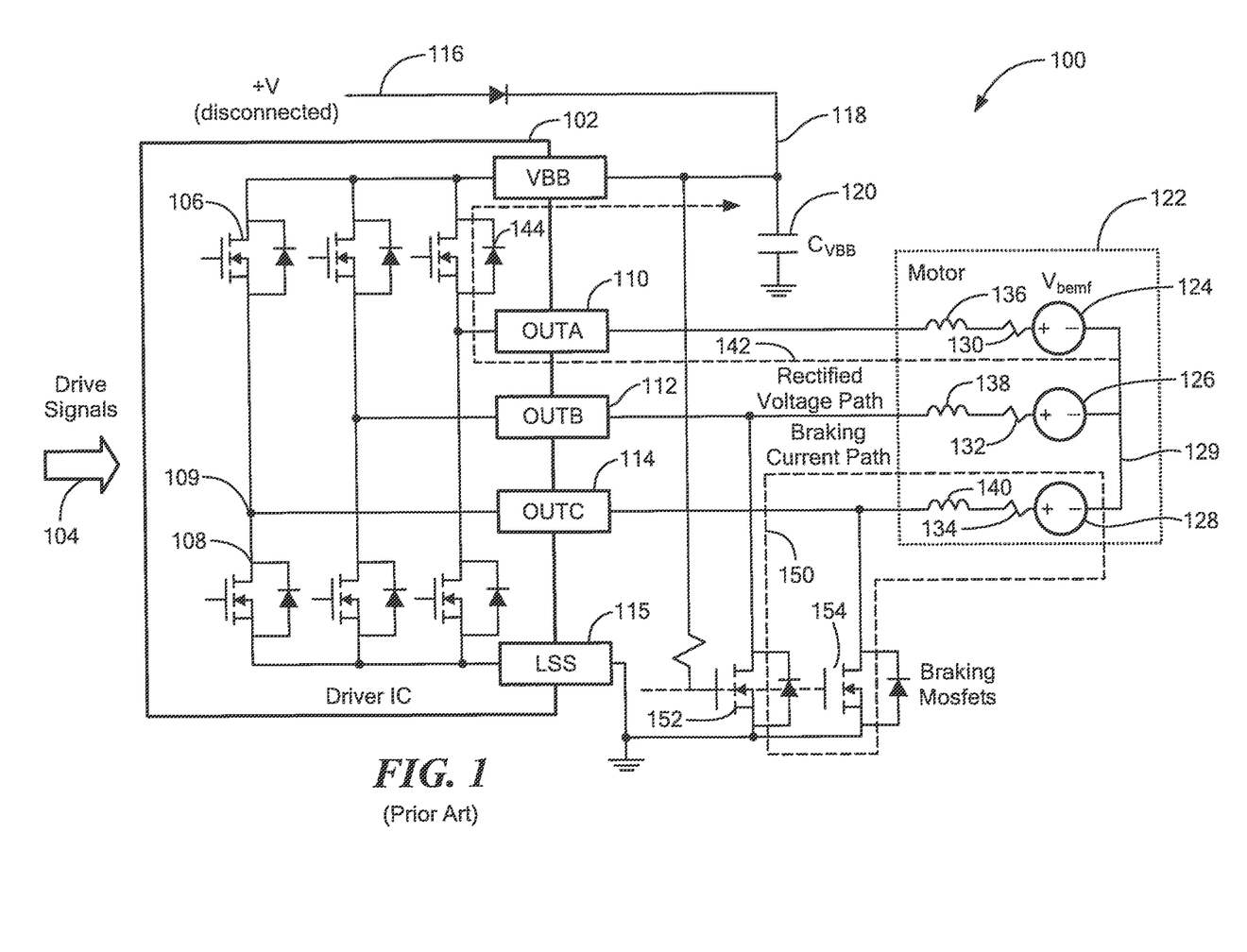
FIG. 1 is a block diagram showing a prior art braking circuit that can be used to retard a rotation of an electric motor.

Referring to FIG. 1, an electronic circuit 100 can be used to receive drive signals 104 to generate drive signals at nodes 110, 112, 114 to drive a motor 122.

The motor 122 can be a three phase motor 122 modeled as three circuit legs coupled at a junction node 129. The three legs can be modeled as having a corresponding three back emf (BEMF) voltage sources 124, 126, 128 (AC sources) coupled in series with a corresponding three resistors 130, 132, 134 and coupled in series with a corresponding three inductors 136, 138, 140.

The electronic circuit 100 can operate in two modes.

In a first mode of operation, also referred to herein as a "running" mode, the drive signals that appear at the nodes 110, 112, 114 can be relatively high power PWM signals to turn the motor 122. In the running mode of operation, the electronic circuit 100 receives an input voltage 116, which can result in a voltage 118 held on a capacitor 120. The voltage 118 can be, for example, twelve volts, twenty-four volts, or six volts. The PWM signals that appear at the nodes 110, 112, 114 can have high states at or near to the voltage 118 and low states at or near zero volts. To this end, the signals that appear at the nodes 110, 112, 114 can be generated by totem poles pairs of transistors, each pair having a junction node. Here are shown three pairs of transistors, of which transistors 106, 108 with junction node 109 are but one example. The transistors, e.g., 106, 108, can be, for example, N-channel MOSFETs (metal oxide silicon field effect transistors). Other types of transistors are also possible, for example, P-channel MOSFETs or p or n type bipolar transistors.

Generation of the drive signals 104 is not described herein but will be understood. Let it suffice here to say that, for a three phase motor 122, the drive signals 104 and resulting signals at the nodes 110, 112, 114 can be one hundred twenty degrees apart.

In a second mode of operation, also referred to herein as a "braking" mode, the power supply voltage 116 is disconnected and the drive signals 104 are controlled so that the six driver MOSFETS are non-conductive. The disconnection may occur, for example, manually by a person who disconnects a malfunctioning motor. However, the disconnection may also occur automatically with disconnection electronic circuits.

In the braking mode of operation, the motor could still turn, for example, if the motor 122 is mechanically coupled to a fan and air blows through the fan by other means. When turned and in the braking mode of operation, the BEMF voltage 124 is generated, and a current 142 flows through an intrinsic MOSFET body diode 144 thereby acting as a rectifier and charging the capacitor 120. An amplitude of the BEMF voltage 124 and the voltage that appears on the capacitor 120 can be proportional to a rate of rotation of the motor 122. If the rate of rotation of the motor 122 is high enough and the voltage on the capacitor 120 is high enough, the voltage can turn on two transistors 152, 154, which are used for braking. A current 150 can result when the rate of rotation of the motor 122 is high enough and the voltage on the capacitor 120 is high enough. It will be understood that the current 150 can operate to retard the rate of rotation of the motor 122

The braking arrangement having the two transistors 152, 154 depends upon the rate of rotation of the motor 122 being high enough and the voltage on the capacitor 120 being high enough. The braking mode of operation can reduce the rate of rotation of the motor only to a predetermined rate.

It should be appreciated that, in the running mode of operation, the transistors 152, 154 can be rendered non-conductive by the rest of the electronic circuit 100, though circuit means for creating said non-conductive state are not shown.

Figure 2:
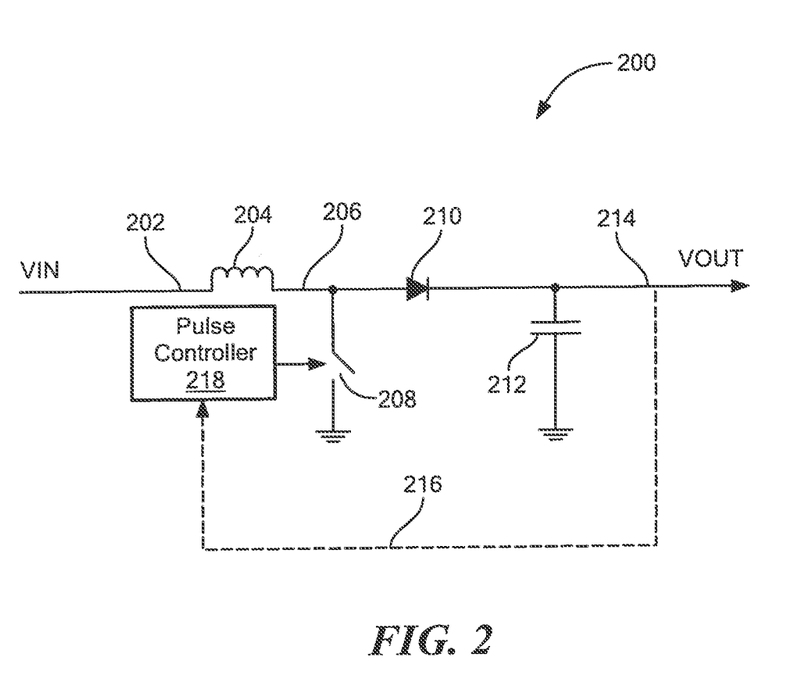
FIG. 2 is a block diagram showing a boost switching regulator.

Referring now to FIG. 2, a boost switching regulator 200 can be coupled to receive an input voltage 202 and can be operable to generate and output voltage 214 higher than the input voltage. In conventional use, the input voltage 202 is a DC voltage. However, in conjunction with FIG. 3, it is described that the input voltage 202 can instead be an AC voltage.

The boost switching regulator 200 can include an inductor 204 having a first end coupled to receive the input voltage 202 and a second end coupled to an anode of a diode 210. A cathode end of the diode 210 can be coupled to the output voltage 214. A capacitor 212 can be coupled between the output voltage 214 and a reference voltage, for example, ground.

A switch 208 can also be coupled between the second end of the inductor and a reference voltage, for example, ground.

In some embodiments a pulse controller 218 can be coupled between the output voltage 214 and a control node of the switch.

In operation, a closure of the switch 208 followed by an opening of the switch can cause a positive voltage transient in a signal 206 at the second end of the inductor. The positive voltage transient can force charge through the diode 210 and into the capacitor 212. A faster pulse width modulation (e.g.,  pulse width and duty cycle) of closures of the switch 208 can result in more charge entering the capacitor 212 and a higher output voltage 214. Feedback signal 216 from the output voltage 214 to the pulse controller 218 can result in control of the pulse width modulation of the closures of the switch 208 and can, therefore, control the output voltage 214 to a regulated output voltage.

In some embodiments, the feedback signal 216 can be omitted, in which case the pulse controller 218 can generate a fixed rate of pulses with fixed pulse durations, in which case, the output voltage 214 is unregulated.

Figure 3:
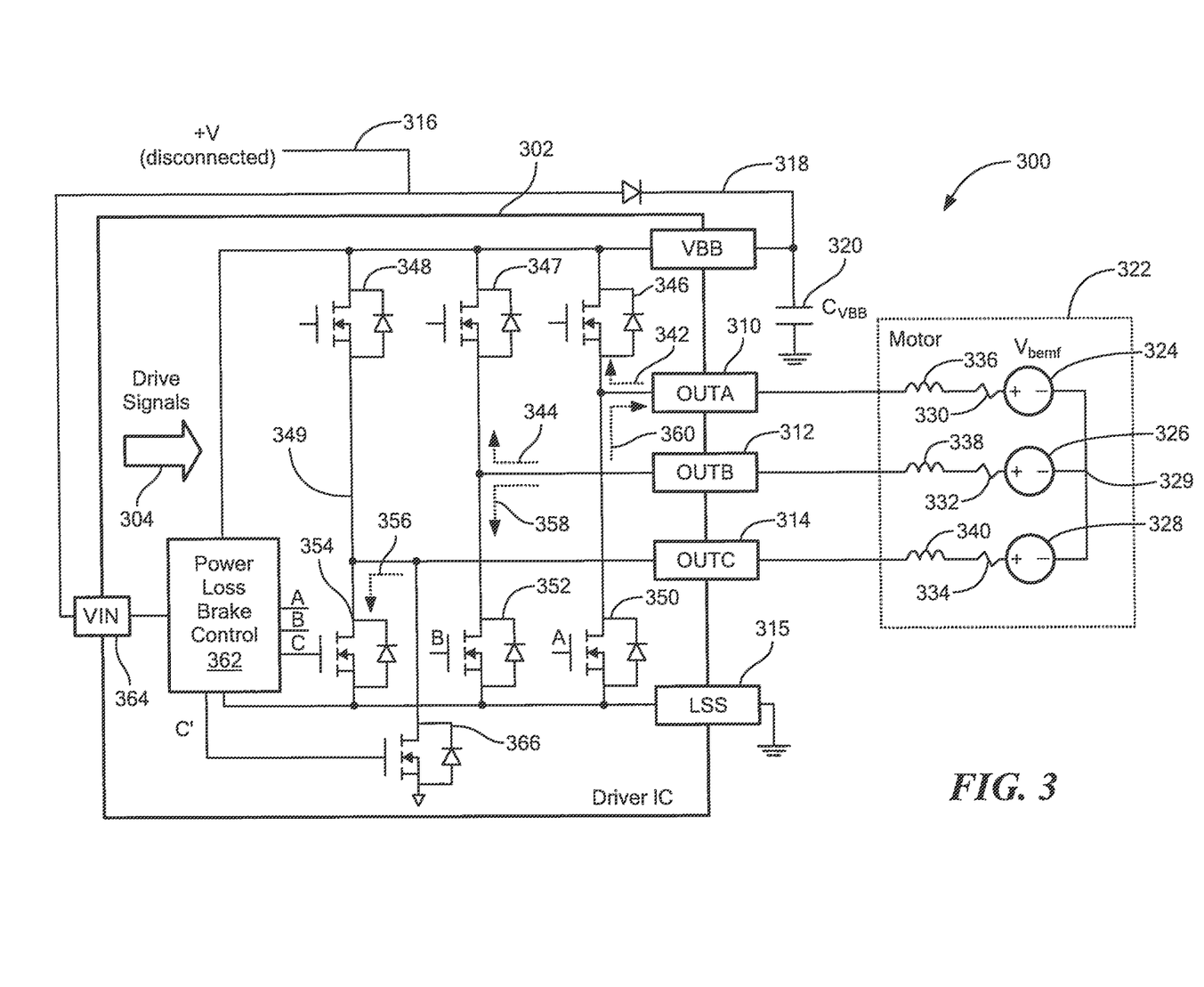
FIG. 3 is a block diagram showing an illustrative electronic circuit (a motor drive circuit) having a braking circuit that can be used to retard a rotation of an electric motor.

Referring to FIG. 3, an illustrative electronic circuit 300 can be used to receive drive signals 304 to generate drive signals at nodes 310, 312, 314 to drive a motor 322. The electronic circuit 300 can be disposed upon a substrate 302.

The motor 322 can be a three phase motor 322 modeled as three circuit legs coupled at a junction node 329. The three legs can be modeled as having a corresponding three back emf (BEMF) voltage sources 324, 326, 328 (AC sources) coupled in series with a corresponding three resistors 330, 332, 334 and coupled in series with a corresponding three inductors 336, 338, 340.

The electronic circuit 300 can operate in two modes.

In a first mode of operation, also referred to herein as a "running" mode, the drive signals that appear at the nodes 310, 312, 314 can be relatively high power PWM signals to turn the motor 322. In the running mode of operation, the electronic circuit 300 receives an input voltage 316, which can result in a voltage 318 held on a capacitor 320. The voltage 318 can be, for example, twelve volts, twenty-four volts, or six volts. The PWM signals that appear at the nodes 310, 312, 314 can have high states at or near to the voltage 318 and low states at or near zero volts. To this end, the signals that appear at the nodes 310, 312, 314 can be generated by totem poles pairs (half bridges) of transistors, each pair having a junction node. Here are shown three pairs of transistors, of which transistors 348, 350 with junction node 349 are but one example. The transistors, e.g., 348, 350, can be, for example, N-channel MOSFETs (metal oxide semiconductor field effect transistors). Other types of transistors are also possible, for example, P-channel MOSFETs or p or n type bipolar transistors.

Generation of the drive signals 304 is not described herein but will be understood. Let it suffice here to say that, for a three phase motor 322, the drive signals 304 and resulting signals at the nodes 310, 312, 314 can be one hundred twenty degrees apart. In some embodiments, the drive signals can be like drive signals described in, U.S. Pat. No. 8,729,841, issued May 20, 2014, which is incorporated herein by reference in its entirety. In some embodiments, circuits to generate the drive signals 304 can also be disposed upon the substrate 302. However, in other embodiments, the drive circuits are not disposed upon the substrate.

In a second mode of operation, also referred to herein as a "braking" mode, the power supply voltage 316 is disconnected (or is otherwise below a threshold voltage, e.g., one volt or 0.5 volts) and the drive signals 304 are set to voltages that render the upper MOSFETs 346, 347, 348 non-conductive (i.e., off) while leaving a power loss brake control circuit 362 in control of the drive signals A, B and C of the lower MOSFETs 350, 352 and 354. In the braking mode of operation, the motor could still turn, for example, if the motor 322 is mechanically coupled to a fan and air blows through the fan.

In a first part of the braking operation, BEMF voltages 324, 326 are generated, and currents 342, 344 flow through intrinsic MOSFET body diodes 346, 348 thereby acting as rectifiers and charging the capacitor 320. Amplitudes of the BEMF voltages 324, 326 and the voltage that appears on the capacitor 320 can be proportional to a rate of rotation of the motor 322. If the rate of rotation of the motor 322 is high enough and the voltage on the capacitor 320 is high enough, the voltage at the capacitor 320 can provide power to the power loss brake control circuit 362. The power loss brake control circuit 362 can also be coupled to receive the input voltage 316.

In a second part of the braking operation, the input voltage 316 is still disconnected (or otherwise below the above-described threshold voltage) and the drive signals 304 are still set to the voltages that render the upper MOSFETs 346, 347, 348 non-conductive while leaving the power loss brake control circuit 362 in control of the drive signals A, B and C of the lower MOSFETs 350, 352 and 354. First, when the voltage on the capacitor 320 is high enough in the first part of the braking operation to turn on the power loss braking control circuit 362, the power loss brake control circuit 362 can generate signals, e.g., three signals, A, B, C. The three signals A, B, C can be coupled to control nodes, e.g., gates, of lower transistors 350, 352, 354. The three signals A, B, C can generally be high to turn on the three lower transistors 350, 352, 354 most of the time, but can also be pulsed low then high again for short duration negative pulses. An on condition of one or more of the three lower transistors 350, 352, 354 results in a breaking operation upon the motor 322, in particular when control signals to the upper three transistors 346, 347, 348 are inactive rendering them to be off.

Examples of the signals A, B, C are shown below in FIGS. 4 and 4A. It will become apparent from discussion below that the pulsing signals A, B, C can result in boost switching regulator operation to drive the voltage on the capacitor 320 to a higher voltage than it would otherwise achieve by operation only of the first part of the braking operation described above. Thus, the braking function can operate to lower rates of rotation of the motor 322 than would otherwise be achieved.

In operation, turning now to one of the boost switching regulators, with comparison to the boost switching regulator 200 of FIG. 2, attention is drawn to BEMF voltage 324, which is an AC voltage while the motor 322 is turning. This AC voltage can be compared with the DC (or AC) input voltage 202 of FIG. 2. Inductor 336 can be compared with the inductor 204 of FIG. 2. The transistor 350 can be compared with the switch 208 of FIG. 2. Diode 346 can be compared with the diode 210 of FIG. 2. Capacitor 320 can be compared with the capacitor 212 of FIG. 2.

When the switch 350, usually closed in the braking mode of operation, is momentarily opened then closed again by the signal A, a positive voltage transient occurs at the inductor 336, resulting in a current flowing through the diode 346 and into the capacitor 320. A voltage is generated at the capacitor 320 higher than would otherwise be achieved on the capacitor 120 of FIG. 1.

Figure 4:
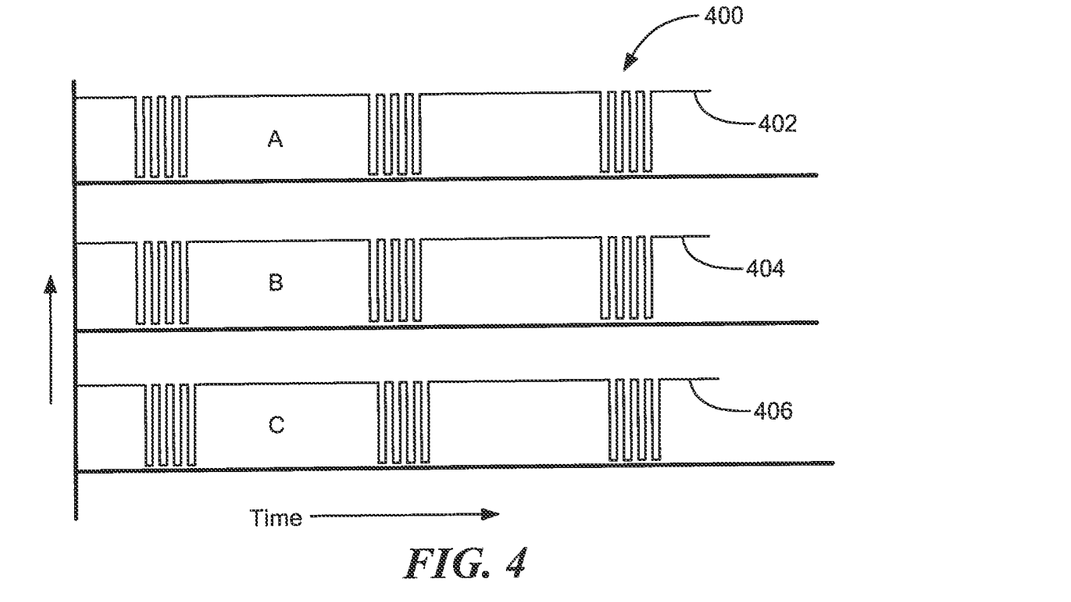
FIGS. 4 and 4A are graphs showing illustrative signals in the braking circuit of FIG. 3.
Figure 4A:
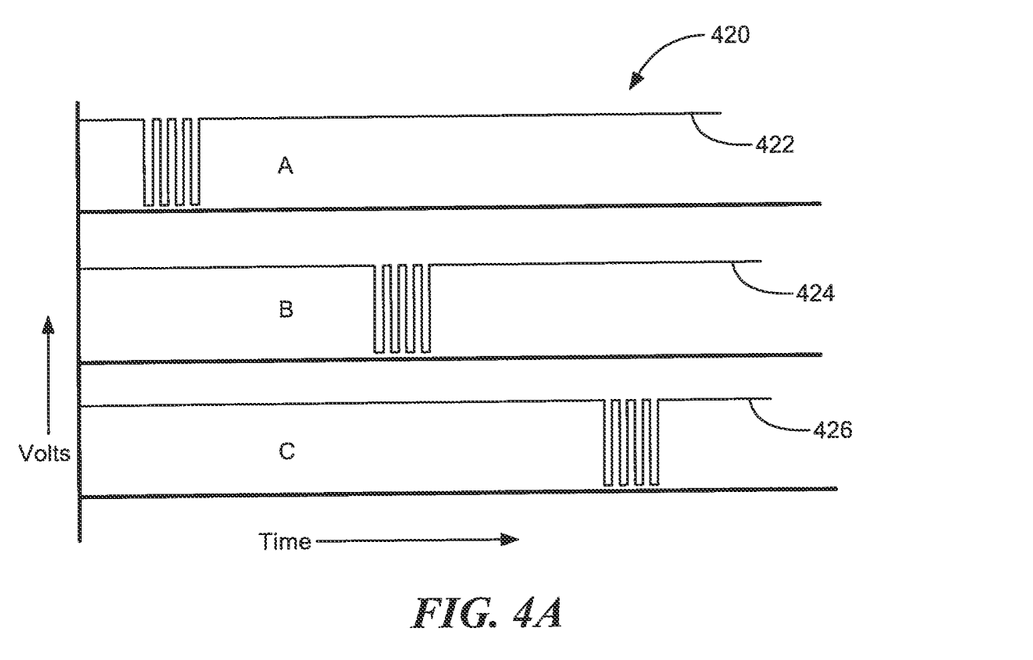

In some embodiments as shown in FIG. 4A, signals A, B, C are pulsed in sequence, where a negative pulse set occurs in only one of the transistors 350, 352, 354 at a time and with a one hundred twenty degrees phase difference between the signals A, B, C. Thus, all three of the transistors 350, 352, 354 can contribute to the higher voltage at the capacitor 320. In other embodiments, the signals A, B, C can be pulsed at essentially the same time, as shown, for example, in FIG. 4.

It should be apparent that opening the switches 350, 352, 354 in sequence results in current pulses passing through diodes 346, 347, 348, in sequence, to result in a boosted voltage at the capacitor 320. Alternatively, switches 350, 352, 354 opening at the same time results in current pulses passing through diodes 346, 347, 348, at the same time, to result in the boosted voltage at the capacitor 320.

While the three signals A, B, C result in three boost regulator structures, in other embodiments, only one or two of the signals A, B, or C is used and only one or two of the transistors 350, 352, 354 are used in boost switching regulator structures.

In some embodiments, the power loss control circuit can use the sensed voltage on the capacitor 320 to control a switching rate and/or pulse width (i.e., pulse width modulation, PWM) of the signals A, B, C. Thus, the switching rate can be controlled to generate a regulated voltage on the capacitor 320.

The braking mode of operation of the electronic circuit can reduce the rate of rotation of the motor 322 to a rate lower than the predetermined rate of rotation of the motor 122 of FIG. 1.

It should be appreciated that, in the running mode of operation, the transistors 350, 352, 354 can be connected to the drive signals rather than to the signals A, B, C, though means for reconnecting are not shown. In some embodiments, digital gates, for example, OR gates, can be used for this purpose. Further details are described below in conjunction with FIG. 6.

The transistors 350, 352, 354 can have so-called "enhancement voltages," Ve, e.g., respective gate-source voltages above which the transistors 350, 352, 354 essentially turn fully on to a resistance $R_{DSe}$. Due to the higher voltage at the capacitor 320, the signals A, B, C can have high states that are above the enhancement voltages Ve. At lower gate voltages, the transistors 350, 352, 354 are only partially on. In some embodiments, the enhancement voltages of the transistors 350, 352, 354 are above about five volts. Enhancement voltages are described more fully below in conjunction with FIG. 5.

In some embodiments, another transistor 366 can be included, which can be coupled to one of the low side transistors 350, 352, 354. The transistor 366 can have a lower enhancement voltage, e.g., two volts, than the transistors 350, 352, 354. Thus, the transistor 366 can turn on and off at voltages of signal C' before the other transistors 350, 352, 354. Thus, the boosting can occur at lower voltages.

In some embodiments, the transistor 366 can be included on the same semiconductor substrate as the other MOSFET transistors 350, 352, 354, 346, 347, 348.

In some embodiments, the three low side transistors 350, 352, 354 are external transistors and not on the same semiconductor substrate.

Any combination of the transistors 346, 347, 348, 350, 352, 354, 366 can be included on a common semiconductor substrate and others can be external separate transistors.

Referring now to FIGS. 4 and 4A, graphs 400, 420 each have three horizontal axes with scales in time in arbitrary units and a common vertical axis with a scale in units of volts in arbitrary units. Signals 402, 404, 406 can correspond to signals A, B, C of FIG. 3. In an alternate embodiment, signals 422, 424, 426 can correspond to signals A, B, C of FIG. 3.

High values of the signals A, B, C are indicative of on states of the transistors 350, 352, 354, respectively, and low states are indicative of the transistors being off. Indicated pulse sets can have one or more pulses, each with two state transitions. The pulse sets 402, 404, 406 can occur and the same time. The pulse sets 422, 424, 426 can be one hundred twenty degrees (or another relationship) apart from each other.

In some embodiments, the rate of pulse sets in the signals 402, 404, 406 is much higher, for example, more than ten times, the rate of cycles of the AC BEMF voltages 324, 326, 328. In some embodiments, the rate of the pulse sets is about twenty five kilohertz and the negative transition pulse widths are about one microseconds long (or shorter) and can be subject to changes by the power loss brake control circuit 316 of FIG. 3 to control the voltage on the capacitor 320. The changes by the power loss brake control circuit 316 are described below in conjunction with FIG. 7.

In some embodiments, the pulse sets 402, 404, 406, 422, 424, 426 are not synchronous with the cycles of the AC BEMF voltages 324, 326, 328. In other embodiments, the pulse sets 402, 404, 406, 422, 424, 426 are synchronous with the cycles of the AC BEMF voltages 324, 326, 328.

In some embodiments, the pulse sets 422, 424, 426 are between about ninety and about one hundred fifty degrees from each other.

Figure 5:
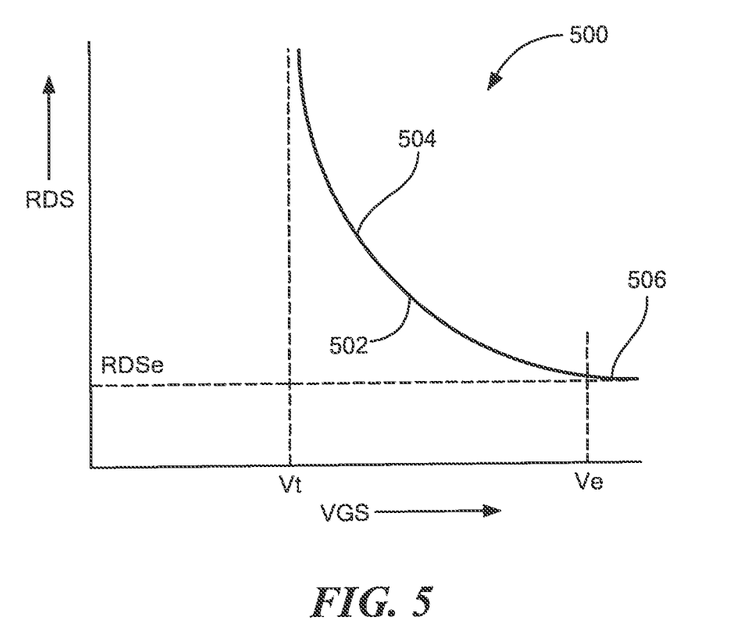
FIG. 5 is a graph showing a transfer characteristic of an N-type FET.

Referring now to FIG. 5, a graph has a horizontal axis with a scale in units of voltage in arbitrary units and a vertical axis with a scale in units of current in arbitrary units. The horizontal axis is indicative a gate-source voltage of a MOSFET and the vertical axis is indicative of a drain source voltage of the MOSFET. A transfer characteristic curve 502 has a region 504 and a region 506. Above a threshold gate-source voltage, Vth, the MOSFET begins to conduct. Above an enhancement gate-source voltage, Ve, the MOSFET reaches a high conductance and a low resistance, RDSe. Above the enhancement voltage, Ve, the MOSFET is essentially fully on.

MOSFETs can be achieved that have different enhancement voltages, Ve, and different threshold voltages, Vt.

Figure 6:
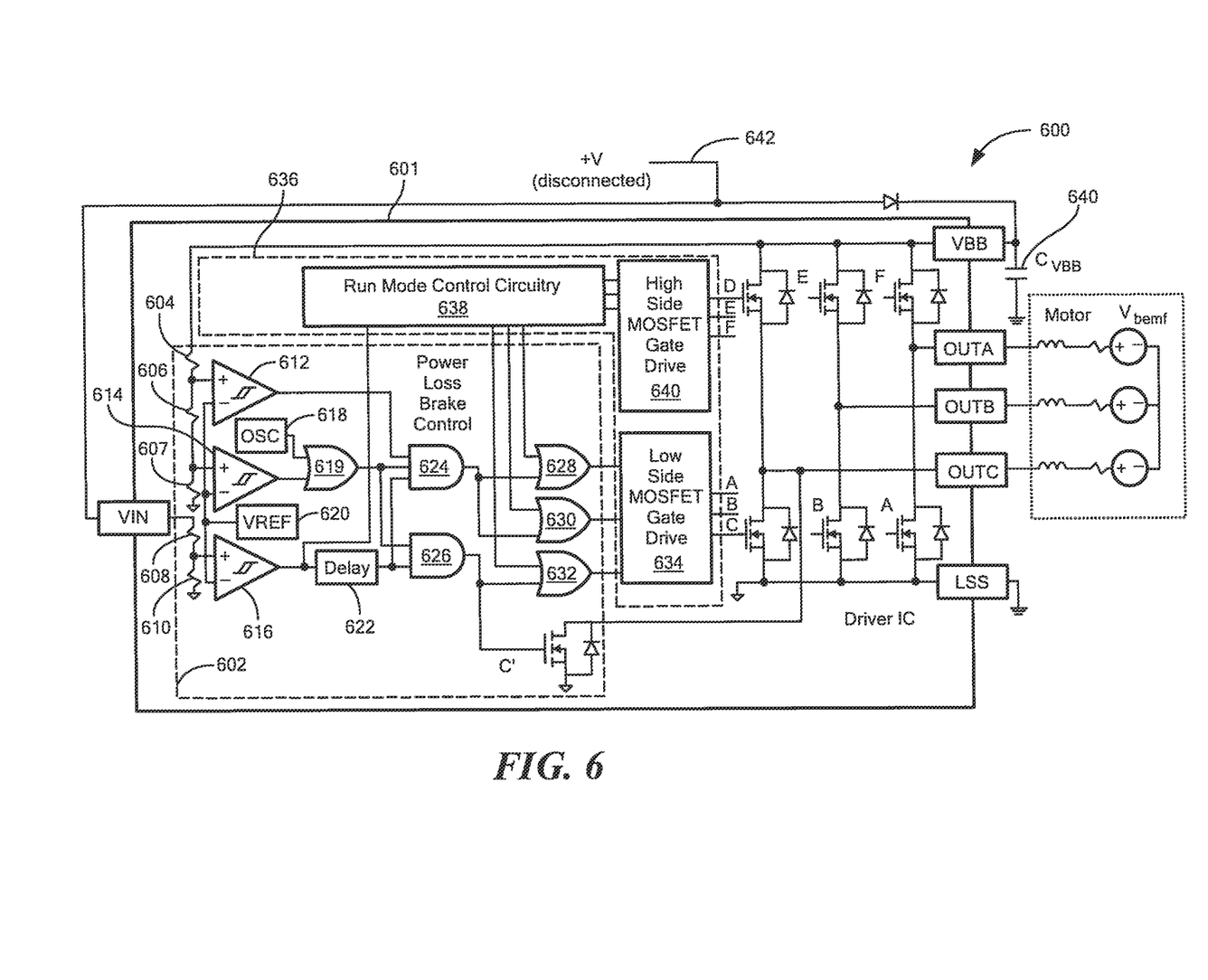
FIG. 6 is a block diagram showing an illustrative electronic circuit having further details of the illustrative braking circuit of FIG. 3.

Referring now to FIG. 6, an illustrative motor drive circuit 600 can include elements of FIG. 3, as will be apparent. Here, power loss brake control circuit 602 can be the same as or similar to the power loss brake control circuit 362 of FIG. 3. The power loss brake control circuit 602 can be used to generate the signals of the graph 400 of FIG. 4. Other similar circuits can be used to generate signals of the graphs 420 of FIG. 4A Resistors 604, 606, 607 can be coupled in series between the voltage at capacitor 640 and a reference voltage, for example, ground. Two junction nodes of the resistors 604, 606, 607 can be coupled to input nodes of first and second respective comparators 612, 614.

Another two resistors 608, 610 can be coupled in series between an input voltage 642 and a reference voltage, for example, ground. A junction node of the resistors 608, 610 can coupled to an input node of a third comparator 616. A delay module 622 can be coupled to receive an output signal from the comparator 616.

A reference voltage generator 620 can be coupled to input nodes of the first, second, and third comparators 612, 614, 616.

A first OR gate 619 can have two input terminals coupled to receive an output signal from the second comparator 614 and a clock signal generated by an oscillator 618.

A three input AND gate 624 can be coupled to receive an output signal generated by the first comparator 612, and output signal generated by the OR gate 619, and an output signal generated by the delay module 622.

A two input AND gate 626 can be coupled to receive the output signal from the first OR gate 619 and the output signal from the delay module 622. An output signal C' from the two input AND gate 626 can be like the signal C' of FIG. 3.

In the braking mode of operation, a second OR gate 628 can be coupled to receive an output signal from the three input AND gate 624. A third OR gate 630 can also be coupled to receive the output signal from the three input AND gate 624. A fourth OR gate 632 can be coupled to receive an output signal from the two input AND gate 626.

In the running mode of operation, the second OR gate 628 can be coupled to receive a first output signal from run mode control circuitry 638. The third OR gate 630 can be coupled to receive a second output signal from the run mode circuitry 638. The fourth OR gate 632 can be coupled to receive a third output signal from the run mode circuitry 638.

With the above arrangement, when in the braking mode of operation, low side MOSFET gate drivers 634 can be controlled by the signals from the three input AND gate 624 and from the two input AND gate 626. In contrast, when in the running mode of operation, the low side MOSFET gate drivers 634 can be controlled by the signals from the run mode control circuitry 638.

The reference voltage generator 620 may be part of the main circuit 600 or may be a low power and low headroom design dedicated to the power loss brake function.

In operation, the third comparator 616 detects the loss of the input voltage 642 and provides a signal to run mode control circuitry 638 to deactivate the low side source drivers. A typical threshold for the third comparator 616 can be about two volts with some hysteresis to prevent chatter (e.g., 200 mV).

The output signal from the third comparator 616 can be delayed by the delay module 622 before activating the power loss mode change to give any active source drivers time to shut off. A typical delay can be one microsecond.

In operation, the second comparator 614 can detect if the voltage, VBB, on the capacitor 640 is above or below a regulation level and also has hysteresis. A typical rising threshold can be about six volts and a typical falling threshold can be about 5.5 volts. When VBB is greater than six volts, the output of the second comparator 614 can be high, which forces the output of the first OR gate 619 high, thereby blocking the signal from the oscillator 618.

The oscillator 618 can have a typical high state duration of about thirty eight microseconds and a typical low pulse width of about two microseconds. The oscillator 618 can run continuously but can be gated by the output of second comparator 614 such that the OFF states created by the two AND gates (i.e., outputs of the AND gates 624, 626 are high) are not present (i.e. boosting is off) when the voltage on the capacitor 640 is above the six volt regulation level.

In operation, the first comparator 612 can detect when the voltage on the capacitor 640 is high enough for all of the boost circuitry described above to operate correctly. A typical threshold for the first comparator 612 can be around two volts with some hysteresis to prevent chatter (e.g., 200 mV).

Figure 7:
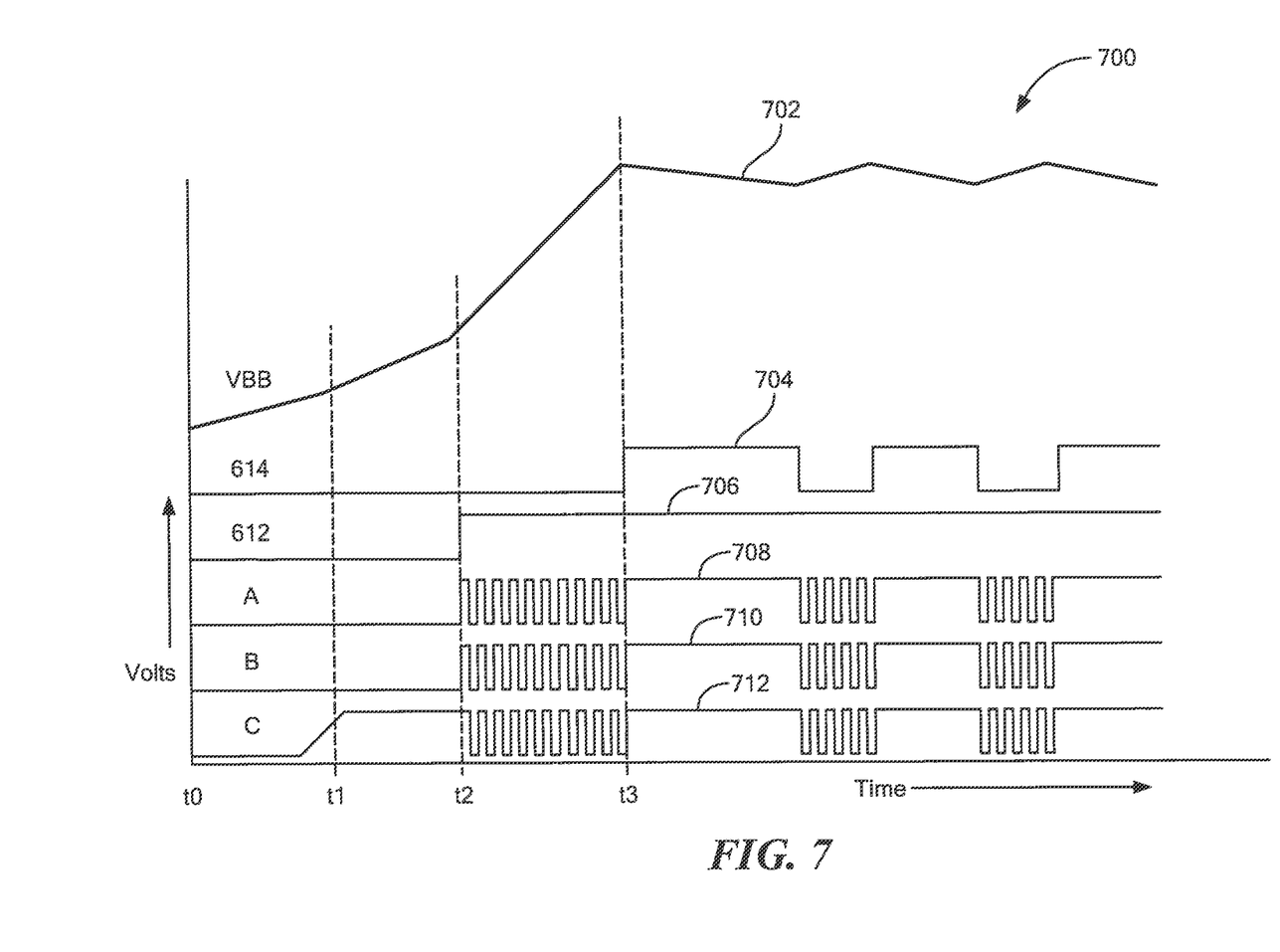
FIG. 7 is a graph showing an illustrative start-up of signals associated with the electronic circuit of FIG. 6.

Referring to FIG. 7 and also to FIG. 6, a graph 700 has a common horizontal axis with a scale in time in arbitrary units and a common vertical axis with a scale in units of volts in arbitrary units.

Signals 706, 708, 710 can correspond to signals A, B, C of FIG. 6. A signal 702 is indicative of the VBB voltage on the capacitor 640. A signal 704 is indicative of an output signal from the second comparator 614. A signal 706 is indicative of an output signal from the first comparator 612.

Between times t0 and t1, the VBB voltage on the capacitor 640 can charge up using rectification through the body diodes of the upper and lower driver MOSFETS in the first part of the braking mode of operation described above in conjunction with FIG. 3.

From time t1 to t2, the VBB voltage on the capacitor can continue to rise with an increased rate when the VBB voltage is sufficient to turn one of the low side MOSFETs. This behavior is further described below. Let it suffice here to say that this is the point where there is enough VBB voltage to turn on one driver (DC) but not enough to fully function. By turning on one driver, a VBB rectified voltage is achieved with only the high side diode drop instead of high side and low side diode drops.

Beginning at time t2, output pulses occur in the A, B, and C signals, resulting in a boosting of the VBB voltage on the capacitor 640 during the second part of the braking mode described above in conjunction with FIG. 3. To this end, there can be a first set of pulses in the signals 708, 710, 712 between times t2 and t3. At the time t3, the VBB voltage can achieve a regulated state, in which case the signals 708, 710, 712 can have pulse sets each with fewer pulses, and the VBB voltage can ripple around the regulated state.

Referring again to FIG. 6, during very low motor speed rotation and with the motor power disconnected, when the rectified VBB voltage is sufficient to power the logic circuitry, the two input AND gate 626 can enable the MOSFET driver (within 634) of the A channel when the signal from the oscillator 618 is high and the input voltage 642 is low. This is not dependent on there being enough voltage for all power loss braking functions to operate as it just serves to ground terminal OUTA, which helps to initially power the capacitor voltage 640 from time t1 to time t2. In essence, if a signal at the terminal OUTA can be made to turn on, then the BEMF voltage only needs to be rectified by the top side body diode to charge the capacitor 640 from time t1 to time t2. The oscillator 618 can be designed in such a way to be never stuck low for any value of the voltage on the capacitor 640.

As VBB (i.e. voltage on capacitor 640) further increases, as a result of the aforementioned grounded terminal OUTA, or an increase in motor rotational rate, when the output of second comparator 614 is low indicating there is sufficient VBB voltage to operate all of the power loss brake control circuitry 602, the oscillator signal coupled through the logic gates and low side MOSFET gate drive circuitry 634 can begin to apply short off pulses to the low side MOSFETs during the time from t2 to t3. During each off pulse some of the energy stored in the inductance of the motor will deliver current to charge the VBB capacitor 640.

When the VBB capacitor 640 reaches the desired regulation level at the time t3, the output of second comparator 614 can block further said short off pulses until the VBB voltage 702 has decreased to the aforementioned level set by the hysteresis of second comparator 614, at which time the said short off pulses are again applied so as to repeat the hysteretic control cycle.

Because the regulation level can be higher than the BEMF voltage of the motor, the low (sink) side MOSFETs driving the motor windings may be fully turned on and the braking action can be maintained at low rates of rotation. Furthermore, because all three sink side MOSFETs conduct at a high duty cycle, the braking efficiency is improved compared to the prior art of FIG. 1 where only two MOSFETs are used to brake the motor. Furthermore, because the sink side MOSFETs are fully turned on, the power dissipation in the MOSFETs is reduced, avoiding excessive heating of these components.

It should be recognized that all of the elements of the power loss brake control circuit 602 can be powered by the voltage on the capacitor 640, which can be boosted by boosting operation described above. Thus, the power loss brake control circuit 602 can operate to lower rotational speeds of the motor than would otherwise be possible.

While particular gates and circuits are used to form the power loss brake control circuit 602, other circuits can be used to generate the same or similar signals.

While the entire motor drive circuit 600 it shown to be disposed upon a common semiconductor substrate 601, in other embodiments, any portion of the motor drive circuit 600 can be disposed upon one or more other semiconductor substrates.

All references cited herein are hereby incorporated herein by reference in their entirety.

Having described preferred embodiments, which serve to illustrate various concepts, structures and techniques, which are the subject of this patent, it will now become apparent that other embodiments incorporating these concepts, structures and techniques may be used. Accordingly, it is submitted that the scope of the patent should not be limited to the described embodiments but rather should be limited only by the spirit and scope of the following claims.

Elements of embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A motor drive circuit for driving an electric motor, comprising:

a plurality of driver circuits, each one of the plurality of driver circuit comprising a high side transistor coupled to a low side transistor in a half bridge arrangement, wherein each one of the high side transistors and each one of the low side transistors has a respective control node and respective first and second current passing nodes, wherein the second current passing node of each of the high side transistors is coupled to the first current passing node of a respective one of the low side transistors at a respective junction node, wherein each one of the plurality of driver circuits is operable to drive a respective current out of a respective junction node into a respective winding of the electric motor;

a capacitor coupled to the first current passing node of each one of the high side transistors, the capacitor operable to hold a capacitor voltage; and a power loss brake control circuit coupled to receive the capacitor voltage from the capacitor and operable to sense when a power supply voltage to the motor drive circuit is below a threshold voltage and, in a braking mode of operation, the high side transistors are off, and also in the braking mode of operation, when the power supply voltage is below the threshold voltage, the power loss brake control circuit is operable to generate at least one pulse signal having at least two state transitions and operable to communicate the at least one pulse signal to a respective at least one of the control nodes of a respective at least one of the low side transistors, resulting in on and off conditions of the at least one of the low side transistors, wherein the on condition of the at least one of the low side transistors results in the braking mode of operation during the on condition, and wherein the at least two state transitions results in a voltage boosting operation such that the capacitor voltage is a boosted voltage, the boosted voltage higher than a voltage that would be achieved without the at least two state transitions.

2. The motor drive circuit of claim 1, wherein the power supply comprises a DC power supply outside of the motor drive circuit.

3. The motor drive circuit of claim 1, wherein each one of the high side transistors and each one of the low side transistors is an N-channel field effect transistor (NFET).

4. The motor drive circuit of claim 1, wherein the at least one pulse signal, when pulsing, is operable to result in a voltage at the capacitor when the power supply voltage is below the threshold voltage and when the electric motor is turning.

5. The motor drive circuit of claim 4, wherein the at least one pulse signal has a plurality of pulses operable to turn on and off the at least one of the low side transistors.

6. The motor drive circuit of claim 5, wherein a back EMF voltage generated by the motor when the motor is turning and the power supply voltage is less than the threshold voltage, an inductance of the electric motor, the at least one of the low side transistors acting as a switch, a parasitic diode of a respective at least one of the high side transistors, and the capacitor, taken together, form a boost switching regulator structure resulting in the voltage on the capacitor when the electric motor is turning.

7. The motor drive circuit of claim 5, wherein, when the power supply voltage is above the threshold voltage, the at least one pulse signal has no pulses.

8. A method of driving an electric motor with a motor drive circuit, comprising:
    providing a plurality of driver circuits, each one of the plurality of driver circuit comprising a high side transistor coupled to a low side transistor in a half bridge arrangement, wherein each one of the high side transistors and each one of the low side transistors has a respective control node and respective first and second current passing nodes, wherein the second current passing node of each of the high side transistors is coupled to the first current passing node of a respective one of the low side transistors at a respective junction node, wherein each one of the plurality of driver circuits is operable to drive a respective current out of a respective junction node into a respective winding of the electric motor;
    providing a capacitor coupled to the first current passing node of each one of the high side transistors;
    holding a capacitor voltage on the capacitor;
    sensing when a power supply voltage to the motor drive circuit is below a threshold voltage to identify a braking mode of operation, and when in the braking mode of operation, the method further comprises:
    turning the high side transistors off;
    generating at least one pulse signal having at least two state transitions; and
    communicating the at least one pulse signal to a respective at least one of the control nodes of a respective at least one of the low side transistors, resulting in on and off conditions of the at least one of the low side transistors, wherein the on condition of the at least one of the low side transistors results in the braking mode of operation during the on condition, and wherein the at least two state transitions results in a voltage boosting operation such that the capacitor voltage is a boosted voltage, the boosted voltage higher than a voltage that would be achieved without the at least two state transitions.

9. The method of claim 8, wherein the power supply comprises a DC power supply outside of the motor drive circuit.

10. The method of claim 8, wherein each one of the high side transistors and each one of the low side transistors is an N-channel field effect transistor (NFET).

11. The method of claim 8, wherein the at least one pulse signal, when pulsing, is operable to result in a voltage at the capacitor when the power supply voltage is below the threshold voltage and when the electric motor is turning.

12. The method of claim 11, wherein the at least one pulse signal has a plurality of pulses operable to turn on and off the at least one of the low side transistors.

13. The method of claim 12, wherein a back EMF voltage generated by the motor when the motor is turning and the power supply voltage is less than the threshold voltage, an inductance of the electric motor, the at least one of the low side transistors acting as a switch, a parasitic diode of a respective at least one of the high side transistors, and the capacitor, taken together, form a boost switching regulator structure resulting in the voltage on the capacitor when the electric motor is turning.

14. The method of claim 12, wherein, when the power supply voltage is above the threshold voltage, the at least one pulse signal has no pulses.

15. A motor drive circuit for driving an electric motor, comprising:
    a plurality of driver circuits, each one of the plurality of driver circuit comprising a high side transistor coupled to a low side transistor in a half bridge arrangement, wherein each one of the high side transistors and each one of the low side transistors has a respective control node and respective first and second current passing nodes, wherein the second current passing node of each of the high side transistors is coupled to the first current passing node of a respective one of the low side transistors at a respective junction node, wherein each one of the plurality of driver circuits is operable to drive a respective current out of a respective junction node into a respective winding of the electric motor;
    a capacitor coupled to the first current passing node of each one of the high side transistors, the capacitor operable to hold a capacitor voltage;
    means for sensing when a power supply voltage to the motor drive circuit is below a threshold voltage to identify a braking mode of operation, and when in the braking mode of operation, the motor drive circuit further includes;
    means for turning the high side transistors off;
    means for generating at least one pulse signal having at least two state transitions; and
    means for communicating the at least one pulse signal to a respective at least one of the control nodes of a respective at least one of the low side transistors, resulting in on and off conditions of the at least one of the low side transistors, wherein the on condition of the at least one of the low side transistors results in the braking mode of operation during the on condition, and wherein the at least two state transitions results in a voltage boosting operation such that the capacitor voltage is a boosted voltage, the boosted voltage higher than a voltage that would be achieved without the at least two state transitions.

16. The motor drive circuit of claim 15, wherein the power supply comprises a DC power supply outside of the motor drive circuit.

17. The motor drive circuit of claim 15, wherein each one of the high side transistors and each one of the low side transistors is an N-channel field effect transistor (NFET).

18. The motor drive circuit of claim 15, wherein the at least one pulse signal, when pulsing, is operable to result in a voltage at the capacitor when the power supply voltage is below the threshold voltage and when the electric motor is turning.

19. The motor drive circuit of claim 18, wherein the at least one pulse signal has a plurality of pulses operable to turn on and off the at least one of the low side transistors.

20. The motor drive circuit of claim 19, wherein a back EMF voltage generated by the motor when the motor is turning and the power supply voltage is less than the threshold voltage, an inductance of the electric motor, the at least one of the low side transistors acting as a switch, a parasitic diode of a respective at least one of the high side transistors, and the capacitor, taken together, form a boost switching regulator structure resulting in the voltage on the capacitor when the electric motor is turning.

21. The motor drive circuit of claim 19, wherein, when the power supply voltage is above the threshold voltage, the at least one pulse signal has no pulses.

* * * * *